US012560683B2

(12) United States Patent (10) Patent No.: US 12,560,683 B2

Haberl et al. (45) Date of Patent: Feb. 24, 2026

(54) RADAR EMULATOR AND METHOD OF TESTING A RADAR SENSOR

(71) Applicant: Rohde & Schwarz GmbH & Co. KG, Munich (DE)

(72) Inventors: Thomas Haberl, Munich (DE); Maximilian Saalfeld, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 316 days.

(21) Appl. No.: 18/317,727

(22) Filed: May 15, 2023

(65) Prior Publication Data

US 2024/0385288 A1 Nov. 21, 2024

(51) Int. Cl.
*G01S 7/40* (2006.01)

(52) U.S. Cl.
CPC ............ *G01S 7/4056* (2013.01); *G01S 7/406* (2021.05)

(58) Field of Classification Search
CPC ...................................................... G01S 7/4052
See application file for complete search history.

(56) References Cited

U.S. PATENT DOCUMENTS

| | | | | |
|---|---|---|---|---|
| 5,047,782 | A * | 9/1991 | Lew ...................... | G01S 7/4052 |
| | | | | 342/172 |
| 5,223,840 | A * | 6/1993 | Cronyn ................. | G01S 7/4052 |
| | | | | 342/170 |
| 5,457,463 | A * | 10/1995 | Vencel .................. | G01S 7/4052 |
| | | | | 342/170 |
| 7,327,308 | B2 * | 2/2008 | Cheng .................. | G01S 7/4056 |
| | | | | 342/178 |
| 10,613,198 | B2 | 4/2020 | Vacanti | |
| 11,422,244 | B2 | 8/2022 | Thorpe et al. | |
| 2006/0267832 | A1 | 11/2006 | Newberg et al. | |
| 2016/0245900 | A1 | 8/2016 | Hurtarte et al. | |
| 2017/0363719 | A1 * | 12/2017 | Ahmed ................. | G01S 7/4052 |
| 2018/0203098 | A1 * | 7/2018 | Heuel ................... | G01S 7/4052 |
| 2020/0300968 | A1 | 9/2020 | Gruber et al. | |
| 2021/0341572 | A1 | 11/2021 | Hamberger et al. | |
| 2022/0099824 | A1 | 3/2022 | Beer et al. | |

* cited by examiner

*Primary Examiner* — Bernarr E Gregory

(74) *Attorney, Agent, or Firm* — CHRISTENSEN O'CONNOR JOHNSON KINDNESS PLLC

(57) ABSTRACT

The present disclosure relates to a radar emulator for testing a radar sensor. The radar emulator comprises a radar signal receiver configured to receive a radar signal having at least one characteristic. The radar emulator has a radar signal processor configured to process the radar signal received. The radar emulator has a response signal generator configured to generate a response signal to the radar signal received. The radar emulator has an interference signal generator configured to generate an interference signal that is synchronized with the response signal in time. The radar emulator has an adder configured to combine the interference signal and the response signal in order to obtain a combined output signal that comprises the response signal generated and the interference signal generated. Further, a method of testing a radar sensor is disclosed.

18 Claims, 1 Drawing Sheet

Receive radar signal

↓

Generate response signal

↓

Generate interference signal

↓

Combine response signal
and interference signal in
order to obtain combined
output signal

↓

Output combined
output signal

RADAR EMULATOR AND METHOD OF TESTING A RADAR SENSOR

FIELD OF THE DISCLOSURE

Embodiments of the present disclosure relate to a radar emulator for testing a radar sensor. Further, embodiments of the present disclosure relate to a method of testing a radar sensor.

BACKGROUND

Nowadays, radar sensors are used in different applications, for instance in vehicles. The number of radar sensors used in vehicles has increased significantly in the recent years due to different modern functionalities provided by the vehicles, for instance autonomous parking or even autonomous driving. In some embodiments, the radar sensors are used to sense the surrounding of the vehicle, thereby ensuring that the vehicle can be parked or even driven in an autonomous manner.

Since multiple radar sensors are integrated into a single vehicle and, additionally, other traffic participants also use multiple radar sensors, the total number of radar sensors used has increased significantly.

Consequently, a single radar sensor is exposed to many different signals that may overlap with a wanted signal. Hence, these different signals may relate to interference signals that have been transmitted by other radar sensors, for instance radar sensors of the same vehicle, radar sensors of other traffic participants or radar stations associated with infrastructure, e.g. V2X stations.

Mainly, this is a problem in case the different signals, namely the interference signals, have (at least partly) similar parameters/characteristics compared to the wanted signal to be received by the single radar sensor.

Therefore, it is necessary to also take such scenarios into account when testing a radar sensor in a testing environment. However, complex testing setups are required that still do not perfectly simulate such scenarios.

Accordingly, there is a need for a possibility to test a radar sensor under real conditions in a cost-efficient and reliable manner.

SUMMARY

Embodiments of the present disclosure provide a radar emulator for testing a radar sensor. In an embodiment, the radar emulator comprises a radar signal receiver capable of receiving a radar signal having at least one characteristic. The radar emulator also comprises a radar signal processor capable of processing the radar signal received. Moreover, the radar emulator has a response signal generator capable of generating a response signal to the radar signal received. Further, the radar emulator comprises an interference signal generator capable of generating an interference signal that is synchronized with the response signal in time. In addition, the radar emulator has an adder capable of combining the interference signal and the response signal in order to obtain a combined output signal that comprises the response signal generated and the interference signal generated.

Further, embodiments of the present disclosure provide a method of testing a radar sensor. In an embodiment, the method comprises the following steps:

Receiving a radar signal from the radar sensor to be tested, which comprises at least one characteristic;

Generating a response signal;

Generating an interference signal, wherein the interference signal is synchronized to the response signal in time; and Combining the interference signal and the response signal in order to obtain a combined output signal that comprises the response signal generated and the interference signal generated.

Accordingly, a single device, namely the radar emulator, is provided that comprises the response signal generator as well as the interference signal generator. The generators are connected with each other by the adder that combines the signals generated in order to provide the combined output signal. The combined output signal can be output by the radar emulator via an output interface. The radar emulator may comprise at least one antenna that is connected with the output interface such that the combined output signal is output via the at least one antenna as a radio signal, namely a radar signal.

In some embodiments, the adder combines the signals generated since they are synchronized with each other in time. This can be achieved easily and in a cost-efficient manner, as both the response signal generator and the interference signal generator are integrated within a single device.

Hence, integration efforts can be drastically reduced due to the fact that the single device, namely the radar emulator, encompasses the response signal generator as well as the interference signal generator.

The single device, namely the radar (target) emulator, also ensures that a single output signal is output that comprises the response signal as well as the interference signal.

Accordingly, the complexity of the testing setup can be reduced significantly, as only one device is used for providing the response signal and the interference signal simultaneously.

Put differently, the interference signal generator, also called an interference source, and the response signal generator, also called a target simulator, are integrated into the single device, namely the radar emulator. This integration already reduces the integration efforts when setting up the testing setup.

In addition the efforts associated with testing the radar sensor are further reduced due to the fact that the interference signal is synchronized to the response signal in time.

An aspect provides that the response signal generator is configured to, for example, generate the response signal based on the at least one characteristic of the radar signal. In other words, the response signal may be generated based on the at least one characteristic of the radar signal. The radar signal received may be analyzed by the radar signal processor in order to determine the at least one characteristic of the radar signal based on which the response signal is generated. This ensures that the response signal matches to the radar signal received. Accordingly, a target can be simulated for the radar sensor to be tested. In other words, the response signal generator is an echo generator, as it is configured to generate an echo signal with regard to the radar signal output by the radar sensor to be tested.

Another aspect provides that the interference signal generator is configured to, for example, generate the interference signal based on the at least one characteristic of the radar signal. In other words, the interference signal may be generated based on the at least one characteristic of the radar signal. The radar signal received may be analyzed by the radar signal processor in order to determine the at least one characteristic of the radar signal based on which the interference signal is generated. This ensures that the interference signal matches to the radar signal received. Accordingly, an interferer can be simulated for the radar sensor to be tested. In other words, the interference signal generator is an interference source, as it is configured to generate an interfering signal with regard to the radar signal output by the radar sensor to be tested.

In some embodiments, the response signal generator and/or the interference signal generator may be controlled by the radar signal processor that has determined the at least one characteristic of the radar signal received previously.

Therefore, a certain scenario can be applied for testing the radar sensor to be tested, as the response signal and/or the interference signal are/is adapted to the radar signal received, namely the at least one characteristic of the radar signal received, which was determined by the radar signal processor.

In general, the radar signal received may be analyzed by the radar signal processor, allowing to directly synchronize the interference signal and the response signal.

In some embodiments, the operation of the interference signal generator and the operation of the response signal generator are synchronized with each other based on the analysis of the radar signal received.

For instance, the at least one characteristic is a ramp of a frequency modulated continuous wave (FMCW) radar signal, a timing information of the radar signal and/or a frequency range of the radar signal. The respective characteristic may be determined by the radar signal processor when processing/analyzing the radar signal received. In some embodiments, a slope of the ramp of the frequency modulated continuous wave (FMCW) radar signal is determined.

The at least one characteristic determined may be used for generating the response signal and/or the interference signal appropriately. Alternatively, a predefined waveform may be used for generating the interference signal.

In some embodiments, the radar signal processor may comprise an estimation circuit that is capable of estimating the at least one characteristic when processing the radar signal received. The radar signal processor does not absolutely determine the at least one characteristic of the radar signal received, but estimates the at least one characteristic based on information obtained when processing the radar signal received. This reduces the efforts required for obtaining the at least one characteristic.

According to a further aspect, the radar signal processor is, for example, a real-time processor that is configured to determine the at least one characteristic in real time. Thus, fast processing of the radar signal received is ensured due to the real-time processor. Accordingly, a delay in processing the radar signal received can be minimized.

In some embodiments, the real-time processor is configured for adapting a setting of a response signal generator and/or a setting of the interference signal generator in real time. Accordingly, a delay in generating the response signal and/or the interference signal can be minimized as well. For instance, the interference signal may be inverted in frequency domain (slope of the ramp for FMCW), within the frequency range of interest and/or time of interest.

In case of a burst signal, an interference signal shall be generated as soon as possible, which can be ensured by the real-time processor.

For instance, the adder is a digital adder that is configured for processing the interference signal and the response signal in a digital manner in order to obtain a digital combined output signal. The digital combined output signal is converted afterwards into in analog combined output signal that is forwarded to the output interface of the radar emulator in order to be transmitted via the at least one antenna connected to the output interface. The digital processing ensures that the interference signal generated and the response signal generated can be synchronized in time in an efficient manner.

In an alternative embodiment, the adder is an analog adder that is configured for processing the interference signal and the response signal in an analog manner in order to obtain an analog combined output signal. The adder may be directly connected, e.g. via a signal line, to the output interface. Hence, no digital to analog conversion (DAC) is necessary prior to outputting the analog combined output signal via the at least one antenna. However, the processing of the interference signal generated and the response signal generated in an analog manner is more complex with regard to the time synchronization of the respective signals generated.

A further aspect provides that the radar emulator comprises, for example, a user interface that is connected with the interference signal generator such that the user is enabled to set the interference signal generator via the user interface. The user may define certain parameters of the interference signal to be used for testing the radar sensor. In some embodiments, a manual setting of the respective testing scenario for the radar sensor can be set accordingly. By using the user interface, the interference signal can be specified (manually). This can be done in an absolute way, e.g. by using a predefined waveform. Hence, the user interface can be regarded as a control module, as controlling is ensured via the user interface. However and as discussed above, the interference signal can also be specified in an adaptive way by the estimated/determined characteristic of the radar signal received.

In addition, the user may define certain parts of the radar signal received to be blanked such that these parts are directly blocked, e.g. not taken into account when generating the response signal and/or the interference signal.

Another aspect provides that the radar signal processor is, for example, configured for generating a synchronization signal to be forwarded to the interference signal generator for synchronizing the interference signal generator and the response signal generator. The respective synchronization signal may be determined based on information obtained when processing the radar signal received, e.g. timing information. In general, the synchronization signal ensures that the interference signal generated and the response signal generated are added in a timely synchronized manner such that an intended testing scenario is obtained.

In some embodiments, the synchronization of the interference signal generator to the response signal generator may relate to a triggering, e.g. triggering the interference signal generator. However, the synchronization of the interference signal generator to the response signal generator may also relate to a detection of presence the radar signal received.

Generally, clock cycles and/or time delay(s) from receipt of the radar signal received, for example inside the radar emulator, e.g. for generating the synchronization signal, are taken into account.

For instance, a trigger signal is derived from the radar signal received that starts outputting the interference signal. The trigger signal corresponds to the synchronization signal, wherein the synchronization signal is used to start the interference signal generator such that the interference signal generator outputs the interference signal. The trigger signal may be a trigger vector.

Alternatively or additionally, time delays can be introduced by using switched lines of various lengths.

In some embodiments, the radar signal receiver, the radar signal processor, the response signal generator and/or the interference signal generator are established on a single hardware chip. Thus, synchronization of the response signal generator and the interference signal generator can be ensured easily. Moreover, information obtained by the radar signal receiver and/or the radar signal processor are directly available. By using the same single hardware chip for implementing the respective components, namely the radar signal receiver, the radar signal processor, the response signal generator and the interference signal generator, real-time processing of the radar emulator can be ensured in a cost-efficient manner.

In some embodiments, the interference signal generator can be a numerically controlled oscillator, for instance with an increasing phase increment.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figures 1, 2:
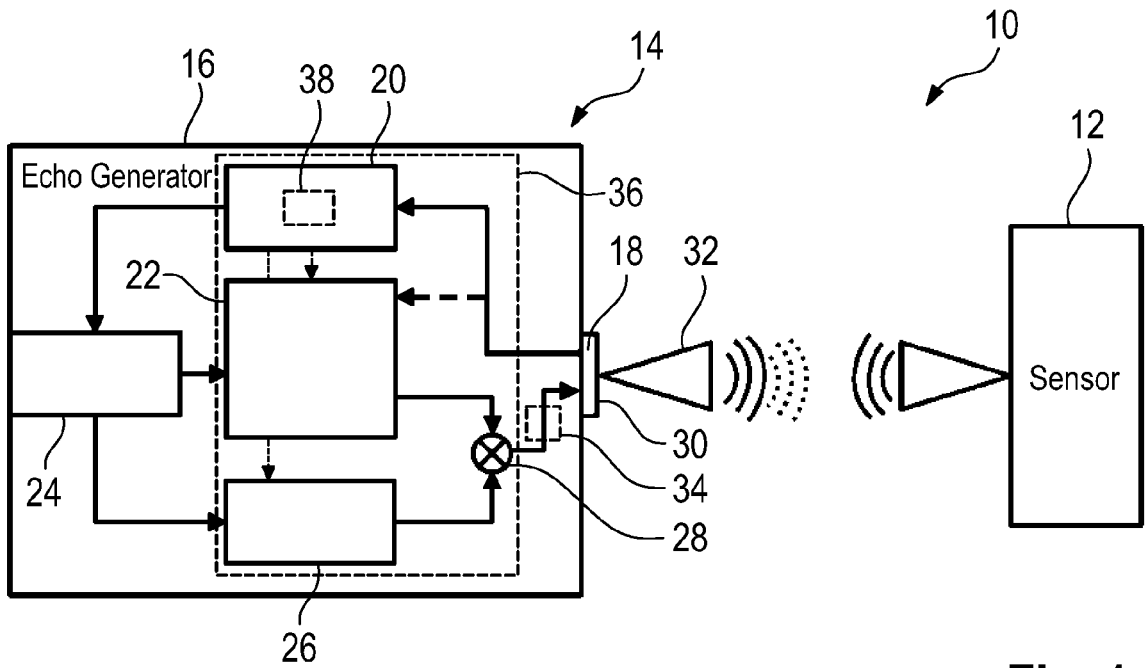
FIG. 1 schematically shows an overview of a radar emulator according to an embodiment of the present disclosure, and FIG. 2 schematically shows an overview of a method of testing a radar sensor according to an embodiment of the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

FIG. 1 depicts one example of a test system 10 that comprises a radar sensor 12 to be tested, namely a device under test (DUT), as well as a radar emulator 14 for testing the radar sensor 12. In some embodiments, the radar sensor 12 may be a separately formed radar sensor or a radar sensor that is integrated within a device. In some embodiments, the radar emulator 14 is a single device that has a housing 16 that encompasses several components that are integrated within the single device, namely the radar emulator 14.

In the embodiment shown, the radar emulator 14 comprises a radar signal receiver 18 that is configured for receiving a radar signal with at least one characteristic, which has been transmitted by the radar sensor 12. In some embodiments, the at least one characteristic may be a ramp of a frequency modulated continuous wave radar signal, a timing information of the radar signal and a frequency range of the radar signal.

The radar signal receiver 18 is connected to a radar signal processor 20 that is configured for processing the radar signal received. The radar signal receiver 18 may be directly connected to a response signal generator 22 that is configured to generate a response signal. Alternatively or additionally, the response signal generator 22 is connected to the radar signal processor 20.

In some embodiments, the respective connection(s) may depend on the computational power of the response signal generator 22, namely whether the response signal generator 22 is capable of analyzing the radar signal received via the radar signal receiver 18 on its own or if the analysis of the radar signal received by the radar signal receiver 18 is done via the radar signal processor 20.

In any case, the radar emulator 14 is used to generate the response signal that corresponds to a response to the radar signal received. Hence, the response signal may relate to an echo signal for the radar sensor 12. Consequently, the radar emulator 14 is also called echo generator.

In some embodiments, the radar emulator 14 comprises a user interface 24 that is connected to the radar signal processor 20, the response signal generator 22 as well as an interference signal generator 26. A user of the radar emulator 14 may control the radar emulator 14 via the user interface 24, for example components thereof.

The interference signal generator 26 is configured for generating an interference signal, for example based on settings done via the user interface 24. In other words, the interference signal may be generated based on a predefined waveform, wherein the user is enabled to set certain parameters of the interference signal via the user interface 24.

Since the interference signal generator 26 is also connected (directly or indirectly via the user interface 24) with the radar signal processor 20, the interference signal may be generated (additionally or alternatively) based on at least one characteristic of the radar signal received that has been determined by the radar signal processor 20. In other words, the interference signal may be generated in an adaptive manner, namely depending on the radar signal received.

This is also shown in FIG. 1 by the respective arrows. In some embodiments, the user interface 24 receives data from the radar signal processor 20 wherein the user interface 24 provides data to the response signal generator 22 and the interference signal generator 26. The data provided to the response signal generator 22 and the interference signal generator 26 may relate to settings done via the user interface 24 or rather the data obtained from the radar signal processor 20, for example in case the radar signal processor 20 is not directly connected with the response signal generator 22 and the interference signal generator 26.

In any case, information obtained from the radar signal processor 20 may be forwarded to the response generator 22 and the interference signal generator 26, either via the user interface 24 or directly.

The radar emulator 14 may also include an adder 28 that is connected to the response signal generator 22 and the interference signal generator 26. The adder 28 combines the interference signal generated by the interference signal generator 26 as well as the response signal generated by the response signal generator 22. Hence, both generators 22, 26 are connected with the adder 28, which generates a combined output signal that comprises the response signal generated and the interference signal generated.

The adder 28 is also connected with an output interface 30 to which at least one antenna 32 is connected. Thus, the combined output signal obtained by the adder 28 is output via the output interface 30 and the at least one antenna 32, namely as a radio frequency (RF) signal.

In some embodiments, the combined output signal is forwarded to the radar sensor 12 over-the-air, wherein the combined output signal comprises the interference signal generated and the response signal generated. The radar sensor 12 receives the single output signal over-the-air, which comprises the response signal and the interference signal accordingly.

According to a certain embodiment, the adder 28 may relate to an analog adder that receives an analog interference signal as well as an analog response signal, wherein these analog signals are combined in an analog manner. According to an alternative embodiment, the adder 28 relates to a digital adder that receives a digital response signal and a digital interference signal, wherein these digital signals are processed/combined by the adder 28 in a digital manner. In this case, a digital to analog converter 34 is provided between the adder 28 and the output interference 30 such that the digital combined output signal is converted into an analog signal by the digital to analog converter 34, wherein the analog combined output signal obtained is forwarded to the output interface 30.

In the shown embodiment, the radar emulator 14 comprises a single hardware chip 36 (e.g., integrated circuit, SoC, ASIC, etc.) on which the radar signal processor 20, the response signal generator 22, the interference signal generator 26 as well as the adder 28 are implemented.

In some embodiments, the radar signal processor 20 may comprises an estimation circuit 38 that is used to estimate the at least one characteristic of the radar signal received when processing the radar signal received. The estimation circuit 38 that estimates the at least one characteristic ensures fast processing.

Generally, the radar signal processor 20 is a real-time processor (circuit) that determines the at least one characteristic of the radar signal received in real time. Moreover, the entire single hardware chip 26 may relate to a real-time processing hardware chip.

The radar emulator 14 shown in FIG. 1 is configured to performing a method of testing, a representative flow-chart of which is shown in FIG. 2.

In a first step, a radar signal from the radar sensor 12 to be tested is received by the radar signal receiver 18. The radar signal received by the radar signal receiver 18 comprises at least one characteristic.

In a second step, a response signal is generated by the response signal generator 22.

In a third step, an interference signal is generated by the interference signal generator 26. The interference signal is synchronized with the response signal in time.

The time synchronization can be ensured by the user interface 24, e.g. settings done via the user interface 24, and/or the radar signal processor 20 that is connected with both the response signal generator 22 and the interference signal generator 26.

In a fourth step, the interference signal and the response signal are combined by the adder 28 in order to obtain the combined output signal that comprises the response signal generated and the interference signal generated.

In a fifth step, the combined output signal is output via the output interface 30.

Specifically, the generation of the response signal and/or the interference signal may be based on the processing of the radar signal received by the radar signal processor 20. In some embodiments, the response signal and/or the interference signal are generated based on the at least one characteristic of the radar signal received, which was determined/estimated by the radar signal processor 20, for example the estimation circuit 38, when processing the radar signal received.

In general, the response signal generator 22 generates the response signal based on the at least one characteristic of the radar signal that was determined or rather estimated. For instance, the at least one characteristic was determined/estimated by the response signal generator 22 itself or the radar signal processor 20.

Hence, the second step may relate to processing the radar signal received to generate the response signal, wherein the response signal is generated based on the at least one characteristic determined/estimated.

Further, the interference signal generator 26 generates the interference signal based on the at least one characteristic of the radar signal that was determined or rather estimated.

Hence, the third step may relate to processing the radar signal received to generate the interference signal, wherein the interference signal is based on the at least one characteristic determined/estimated and wherein the interference signal is synchronized to the response signal in time.

Additionally or alternatively, the interference signal is generated based on a setting done by the user via the user interface 24. In some embodiments, the user is enabled to set the interference signal generator 26 via the user interface 24 in order to define a certain interference signal to be used in a testing scenario for testing the radar sensor 12.

The time synchronization of the interference signal and the response signal ensures that both signals occur simultaneously in a respective testing scenario.

For instance, the radar signal processor 20, when processing the radar signal received, generates a synchronization signal to be forwarded to the interference signal generator 26 for synchronizing the interference signal generator 26 with the response signal generator 22. The respective synchronization signal may relate to a trigger signal, e.g. a trigger vector, that is derived from the radar signal received, wherein the trigger signal starts the interference signal generator 26. In other words, the trigger signal triggers the starting of the interference signal generator 26 such that the interference signal generator 26 starts outputting the interference signal once the trigger signal is received.

Alternatively, the respective synchronization signal is based on detecting the radar signal received, wherein internal delays of the radar emulator 14 are taken into account when controlling the interference signal generator 26 and/or the response signal generator 22 such that both the interference signal generator 26 and the response signal generator 22 output their respective generated signals.

In some embodiments, the interference signal generator 26 may be a numerically controlled oscillator, for instance with an increasing phase increment.

Certain embodiments disclosed herein include components that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry." "circuit." "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, micropro- cessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or cir- cuits, etc., or combinations of special purpose hardware circuits and computer instructions form specifically config- ured circuits, machines, apparatus, devices, etc., capable of implemented the functionality described herein.

In some embodiments, one or more computer-readable media is provided containing computer readable instructions embodied thereon that, when executed by one or more processor circuits, sometimes referred to as one or more computing devices, cause the one or more computing devices to perform one or more steps of the methods described herein or claimed below, such as one or more actions described in association with FIG. 2.

In the foregoing description, specific details are set forth to provide a thorough understanding of representative embodiments of the present disclosure. It will be apparent to one skilled in the art, however, that the embodiments dis- closed herein may be practiced without embodying all of the specific details. In some instances, well-known process steps have not been described in detail in order not to unneces- sarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present applica- tion may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments dis- closed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A radar emulator for testing a radar sensor, the radar emulator comprising
   a radar signal receiver configured to receive a radar signal having at least one characteristic, wherein the at least one characteristic comprises a ramp of a frequency modulated continuous wave radar signal;
   a radar signal processor configured to process the radar signal received;
   a response signal generator configured to generate a response signal to the radar signal received;
   an interference signal generator configured to generate an interference signal that is synchronized with the response signal in time and to generate the interference signal based on the at least one characteristic of the radar signal, and
   an adder configured to combine the interference signal and the response signal in order to obtain a combined output signal that comprises the response signal gen- erated and the interference signal generated.

2. The radar emulator according to claim 1, wherein the response signal generator is configured to generate the response signal based on the at least one characteristic of the radar signal.

3. The radar emulator according to claim 1, wherein the at least one characteristic further comprises at least one of a timing information of the radar signal or a frequency range of the radar signal.

4. The radar emulator according to claim 1, wherein the radar signal processor comprises an estimation circuit that is configured to estimate the at least one characteristic when processing the radar signal received.

5. The radar emulator according to claim 1, wherein the radar signal processor is a real-time processor that is con- figured to determine the at least one characteristic in real time.

6. The radar emulator according to claim 5, wherein the real-time processor is configured to adapt a setting of the response signal generator and/or wherein the real-time pro- cessor is configured to adapt a setting of the interference signal generator in real time.

7. The radar emulator according to claim 1, wherein the adder is a digital adder that is configured to process the interference signal and the response signal in a digital manner in order to obtain a digital combined output signal.

8. The radar emulator according to claim 1, wherein the adder is an analog adder that is configured to process the interference signal and the response signal in an analog manner in order to obtain an analog combined output signal.

9. The radar emulator according to claim 1, wherein the radar emulator comprises a user interface that is connected with the interference signal generator such that the user is enabled to set the interference signal generator via the user interface.

10. The radar emulator according to claim 1, wherein the radar signal processor is configured to generate a synchronization signal to be forwarded to the interference signal generator for synchronizing the interference signal generator and the response signal generator.

11. The radar emulator according to claim 1, wherein the radar signal receiver, the radar signal processor, the response signal generator and/or the interference signal generator are established on a single hardware chip.

12. A method of testing a radar sensor, with the following steps:

receiving a radar signal from the radar sensor to be tested, which comprises at least one characteristic, wherein the at least one characteristic comprises a ramp of a frequency modulated continuous wave radar signal;

generating a response signal;

generating an interference signal based on the at least one characteristic of the radar signal, wherein the interference signal is synchronized to the response signal in time; and combining the interference signal and the response signal in order to obtain a combined output signal that comprises the response signal generated and the interference signal generated.

13. The method according to claim 12, wherein the interference signal and the response signal are digital signals that are combined such that a digital combined output signal is obtained.

14. The method according to claim 12, wherein the response signal is generated based on the at least one characteristic of the radar signal.

15. The method according to claim 12, wherein at least one of a setting of the response signal generator and a setting of the interference signal generator is set in real time and/or wherein the at least one characteristic of the radar signal received is determined in real time.

16. The method according to claim 12, wherein a user sets the interference signal generator via a user interface.

17. The method according to claim 12, wherein a synchronization signal is generated and forwarded to the interference signal generator for synchronizing the interference signal generator and the response signal generator.

18. The method according to claim 12, wherein a trigger signal is derived from the radar signal received that starts outputting the interference signal.

\* \* \* \* \*